(12) United States Patent
Iwanami et al.

(10) Patent No.: US 12,007,580 B2
(45) Date of Patent: Jun. 11, 2024

(54) RETICLE UNIT AND OPTICAL SIGHTING DEVICE

(71) Applicant: LIGHT OPTICAL WORKS, LTD., Nagano (JP)

(72) Inventors: Masatomi Iwanami, Nagano (JP); Kan Hanaoka, Nagano (JP); Toru Murakami, Nagano (JP)

(73) Assignee: LIGHT OPTICAL WORKS, LTD., Nagano (JP)

( * ) Notice: Subject to any disclaimer, the term of this patent is extended or adjusted under 35 U.S.C. 154(b) by 531 days.

(21) Appl. No.: 17/290,993

(22) PCT Filed: Nov. 28, 2018

(86) PCT No.: PCT/JP2018/043735
§ 371 (c)(1),
(2) Date: May 3, 2021

(87) PCT Pub. No.: WO2020/110223
PCT Pub. Date: Jun. 4, 2020

(65) Prior Publication Data
US 2022/0043276 A1 Feb. 10, 2022

(51) Int. Cl.
*G02B 27/34* (2006.01)
*F41G 1/34* (2006.01)
(Continued)

(52) U.S. Cl.
CPC ............. *G02B 27/34* (2013.01); *F41G 1/345* (2013.01); *F41G 1/38* (2013.01); *G02B 23/00* (2013.01)

(58) Field of Classification Search
CPC ........ G02B 27/34; G02B 23/00; G02B 27/32; F41G 1/345; F41G 1/38; F41G 1/00; F41G 1/32; F41G 1/34; F41G 1/42; F41G 1/425
(Continued)

(56) References Cited

U.S. PATENT DOCUMENTS

2018/0224242 A1  8/2018  Bellah et al.

FOREIGN PATENT DOCUMENTS

| JP | S5420747 | 2/1979 |
| JP | S6011315 | 1/1985 |

(Continued)

OTHER PUBLICATIONS

"International Search Report (Form PCT/ISA/210) of PCT/JP2018/043735," dated Feb. 12, 2019, with English translation thereof, pp. 1-4.
(Continued)

*Primary Examiner* — Arnel C Lavarias
(74) *Attorney, Agent, or Firm* — JCIPRNET

(57) ABSTRACT

Provided is a reticle unit 40 that includes a reticle 41 with a sight line 410, and an optical fiber 42 that forms a dot by guiding light from a light source to a center 410a of the sight line 410, wherein a light incident portion 42a for receiving light is formed at one end of the optical fiber 42, a light-emitting portion 42b for emitting light is formed at the other end 42b of the optical fiber 42, the light incident portion 42a has a spherical surface having a diameter greater than that of the optical fiber 42, the light-emitting portion 42b has an inclined surface that reflects light passing through the optical fiber 42, and the optical fiber 42 is fixed along a part of the sight line 410 so that the light-emitting portion 42b is positioned at the center 410a of the sight line 410.

12 Claims, 4 Drawing Sheets

(51) Int. Cl.
*F41G 1/38* (2006.01)
*G02B 23/00* (2006.01)

(58) Field of Classification Search
USPC .......... 359/428, 362, 399; 42/111, 113, 114,
42/119, 122, 123, 130, 131, 132
See application file for complete search history.

(56) References Cited

FOREIGN PATENT DOCUMENTS

| | | | | |
|---|---|---|---|---|
| JP | H08220378 | | 8/1996 | |
| JP | 2579280 Y2 | * | 8/1998 | |
| JP | 2003262758 | | 9/2003 | |
| JP | 2004347980 A | * | 12/2004 | ......... C09K 11/7792 |
| JP | 2005508522 | | 3/2005 | |
| JP | 2018524542 | | 8/2018 | |
| WO | 03040800 | | 5/2003 | |
| WO | 2012057010 | | 5/2012 | |
| WO | WO-2019173317 A1 | * | 9/2019 | ............. F41G 1/345 |

OTHER PUBLICATIONS

Office Action of Japan Counterpart Application, with English translation thereof, dated Oct. 11, 2022, pp. 1-8.
Office Action of Japan Counterpart Application, with English translation thereof, dated May 17, 2022, pp. 1-6.
Office Action of Japan Counterpart Application, with English translation thereof, dated Nov. 14, 2023, pp. 1-4.

* cited by examiner

RETICLE UNIT AND OPTICAL SIGHTING DEVICE

CROSS-REFERENCE TO RELATED APPLICATION

This application is a 371 application of the International PCT application serial no. PCT/JP2018/043735, filed on Nov. 28, 2018. The entirety of the above-mentioned patent application is hereby incorporated by reference herein and made a part of this specification.

BACKGROUND

Technical Field

The invention relates to a reticle unit for aiming at a target, and an optical sighting device including the reticle unit.

Description of Related Art

An optical sighting device such as a rifle scope is provided with a reticle for aiming at a target. A general reticle has a sight line in the shape of a cross, a T, an inverted T, a vertical line or a horizontal line, for example. There are two types of reticles, wire type and glass substrate type. The wire type reticle has a configuration that the sight line is formed by two wires orthogonal to each other. The glass substrate type reticle has a configuration that the sight line is drawn on a surface of a glass substrate.

However, the reticle is built in a lens barrel of the optical sighting device. Therefore, it is difficult to visually recognize the sight line under low light conditions. Thus, a reticle unit that displays a dot of light at the center of the reticle has been proposed. The reticle unit includes a light source such as an LED, and an optical fiber that forms a dot by guiding light from the light source to the center of the reticle. A reticle unit having such a configuration is disclosed in FIG. 12 and FIG. 13 of International Publication No. 2003/040800.

RELATED ART

Patent Document

[Patent Document 1] International Publication No. 2003/040800
[Patent Document 2] International Publication No. 2012/057010

SUMMARY

Problems to be Solved

The first problem is that, for the conventional reticle unit, the amount of light of the dot formed by the optical fiber is small, and the dot is dark and difficult to see. The dark dot results from the structure of the optical fiber. As disclosed in FIG. 13 of International Publication No. 2003/040800, the diameter of the optical fiber is the same as the line width of the sight line and is extremely small. Therefore, the amount of light guided from one end surface to the other end surface of the optical fiber is extremely small. Also, as disclosed in FIG. 12 of International Publication No. 2003/040800, two end surfaces of the optical fiber, that is, the inlet and outlet of light, are both plane surfaces cut in a direction perpendicular to the central axis of the optical fiber. Therefore, the cross-sectional areas of both the inlet and outlet of the optical fiber are extremely small. In particular, the inlet of the optical fiber can allow only a small amount of light to enter. As a result, the amount of light of the dot formed at the outlet of the optical fiber decreases. For example, under high light conditions such as a sunny day, it is difficult to visually recognize the dot with a small amount of light.

Furthermore, since the outlet of the optical fiber is a plane surface cut in the direction perpendicular to the central axis of the optical fiber, the light entering the optical fiber cannot be reflected in the direction of the eye of the user, that is, the direction of an eyepiece lens of the optical sighting device. Therefore, as disclosed in FIG. 13 of International Publication No. 2003/040800, the outlet of the optical fiber is directly bonded to the center of the cross sight line. However, since the bonding area is extremely small, there is a problem that the outlet of the optical fiber may easily deviate from the center of the cross sight line due to a strong impact during shooting.

The second problem is that it is difficult and takes time and effort to manufacture an optical fiber having a predetermined length. The optical fiber used in the conventional reticle unit is manufactured through a process of cutting two ends, and a process of smoothing the cut surfaces at the two ends. Because the optical fiber is very fragile, the optical fiber is often broken or cracked by the two cutting processes. Therefore, defective products are extremely likely to occur in the cutting processes.

In addition, even if two ends of the optical fiber can be cut properly, the two end surfaces that have just been cut do not have sufficient optical smoothness. Two end surfaces of the optical fiber are the inlet and outlet for light and have to be smooth enough to prevent optical problems. Therefore, in order to manufacture an optical fiber having a predetermined length, in addition to the two cutting processes, two polishing processes for smoothing the cut surfaces at two ends are required.

The invention has been made in view of the above problems, and the invention provides a reticle unit and an optical sighting device that are capable of increasing the amount of light of the dot, have excellent impact resistance, and can be manufactured efficiently.

Means for Solving the Problems (1) In order to achieve the above, a reticle unit of the invention includes a reticle that has a sight line, and an optical fiber that forms a dot by guiding light from a light source to a center of the sight line. A light incident portion for receiving light is formed at one end of the optical fiber. A light-emitting portion for emitting light is formed at the other end of the optical fiber. The light incident portion has a spherical surface that has a diameter greater than a diameter of the optical fiber. The light-emitting portion has an inclined surface that reflects light passing through the optical fiber. The optical fiber is fixed along a part of the sight line so that the light-emitting portion is positioned at the center of the sight line.

(2) Preferably, in the reticle unit of the above (1), the optical fiber has a diameter equal to or smaller than a line width of the sight line and is bonded along a part of the sight line.

(3) Preferably, in the reticle unit of the above (1) or (2), the optical fiber is composed of a glass material, and the light incident portion is formed by thermally melting one end of the optical fiber.

(4) Preferably, in the reticle unit of any of the above (1) to (3), an angle of the inclined surface of the light-emitting portion is 45 degrees, and the inclined surface reflects light passing through the optical fiber at a right angle.

(5) Preferably, in the reticle unit of any of the above (1) to (4), the reticle is made of a thin metal plate, and the sight line is integrally provided on the metal plate.

(6) In order to achieve the above, an optical sighting device of the invention is provided with a reticle unit built in a lens barrel. The reticle unit includes a reticle that has a sight line, and an optical fiber that forms a dot by guiding light from a light source to a center of the sight line. A light incident portion for receiving light is formed at one end of the optical fiber. A light-emitting portion for emitting light is formed at the other end of the optical fiber. The light incident portion has a spherical surface that has a diameter greater than a diameter of the optical fiber. The light-emitting portion has an inclined surface that reflects light passing through the optical fiber. The optical fiber is fixed along a part of the sight line so that the light-emitting portion is positioned at the center of the sight line.

Effects

The reticle unit and the optical sighting device of the invention are capable of increasing the amount of light of the dot, have excellent impact resistance, and can be manufactured efficiently.

DESCRIPTION OF THE EMBODIMENTS

Hereinafter, an optical sighting device and a reticle unit according to the embodiments of the invention will be described with reference to the drawings.
<Optical Sighting Device>

Figure 1:
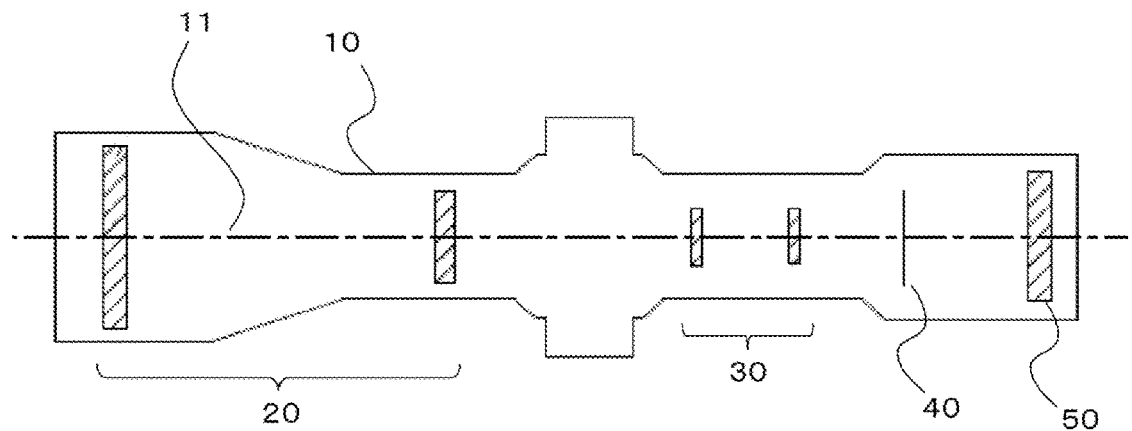
FIG. 1 is a schematic view showing an optical sighting device according to an embodiment of the invention.

FIG. 1 shows the configuration of an optical sighting device 1 of this embodiment. The optical sighting device 1 is, for example, a rifle scope and is mounted on a rifle (not shown). The optical sighting device 1 includes an objective lens 20, an upright lens 30, a reticle unit 40, and an eyepiece lens 50 on an optical axis 11 in a lens barrel 10. Further, a light source 60 shown in FIG. 3 and FIG. 4 is arranged above the reticle unit 40 in the lens barrel 10.

The objective lens 20 forms an inverted image of an object (target). The upright lens 30 converts the inverted image of the objective lens 20 into an upright image. The upright lens 30 of this embodiment includes two lenses shown in FIG. 1, and the magnification can be changed by moving these lenses close to or away from each other. The magnification of the upright lens 30 is not particularly limited and can be, for example, in a range of 0.75 times to 80 times.

The reticle unit 40 is arranged at a position conjugate with the inverted image of the objective lens 20 and at a position coinciding with the upright image of the upright lens 30. The reticle unit 40 displays a cross sight line 410 and a dot 61 of light shown in FIG. 3. The sight line 410 and the dot 61 are superimposed on the upright image of the upright lens 30. A user of the optical sighting device 1 can observe through the eyepiece lens 50 by superimposing the sight line 410 and the dot 61 on the upright image of the object (target).
<Reticle Unit>

Figure 2:
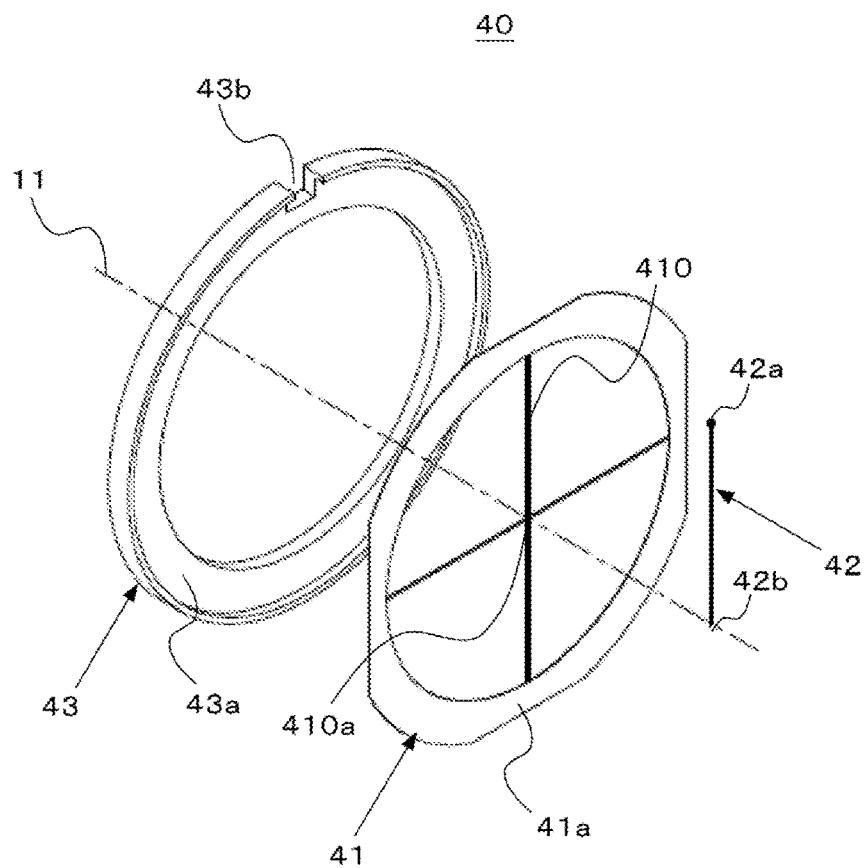
FIG. 2 is a perspective exploded view showing a reticle unit according to an embodiment of the invention.
Figure 3:
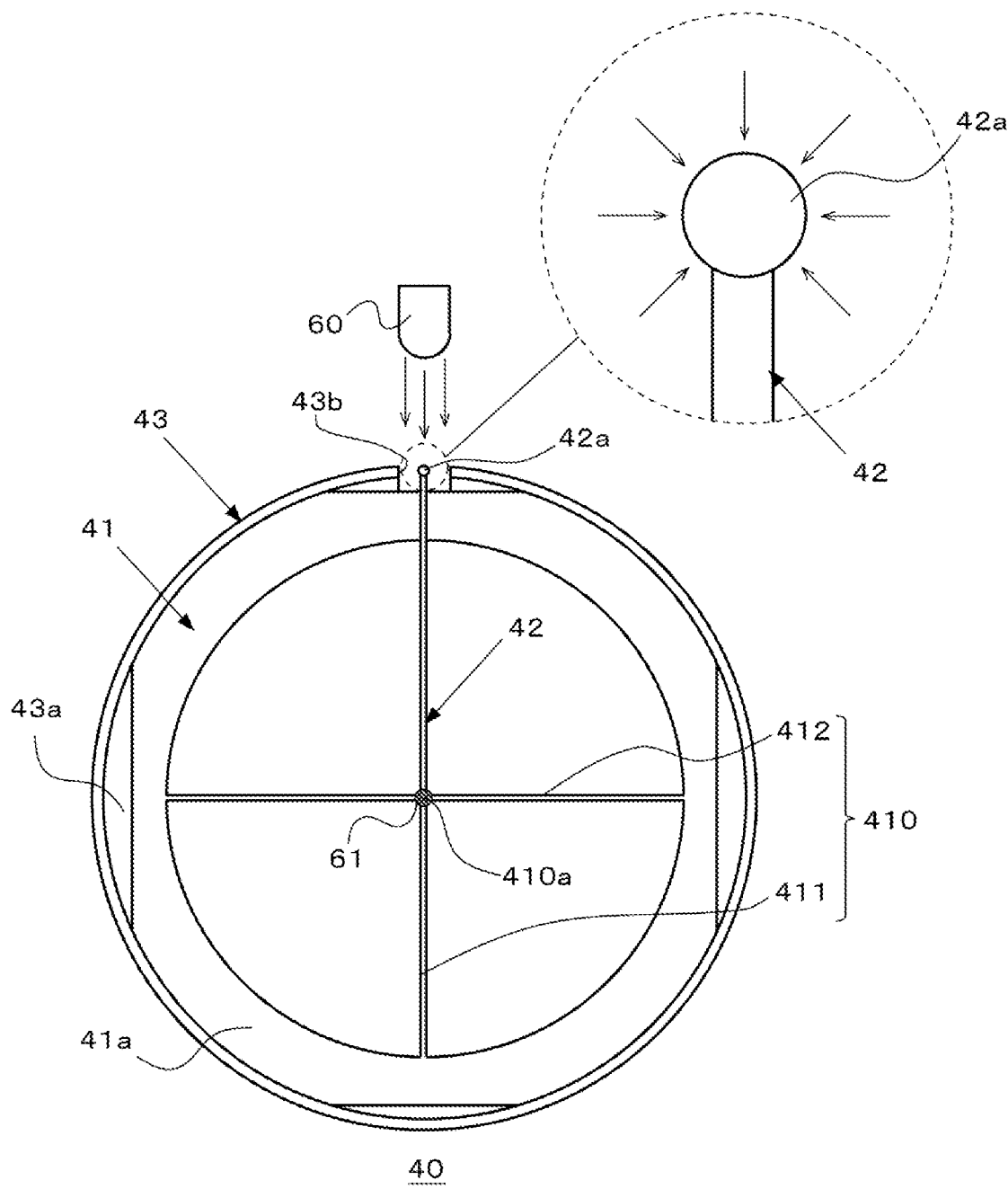
FIG. 3 is a front view showing the reticle unit.
Figure 4:
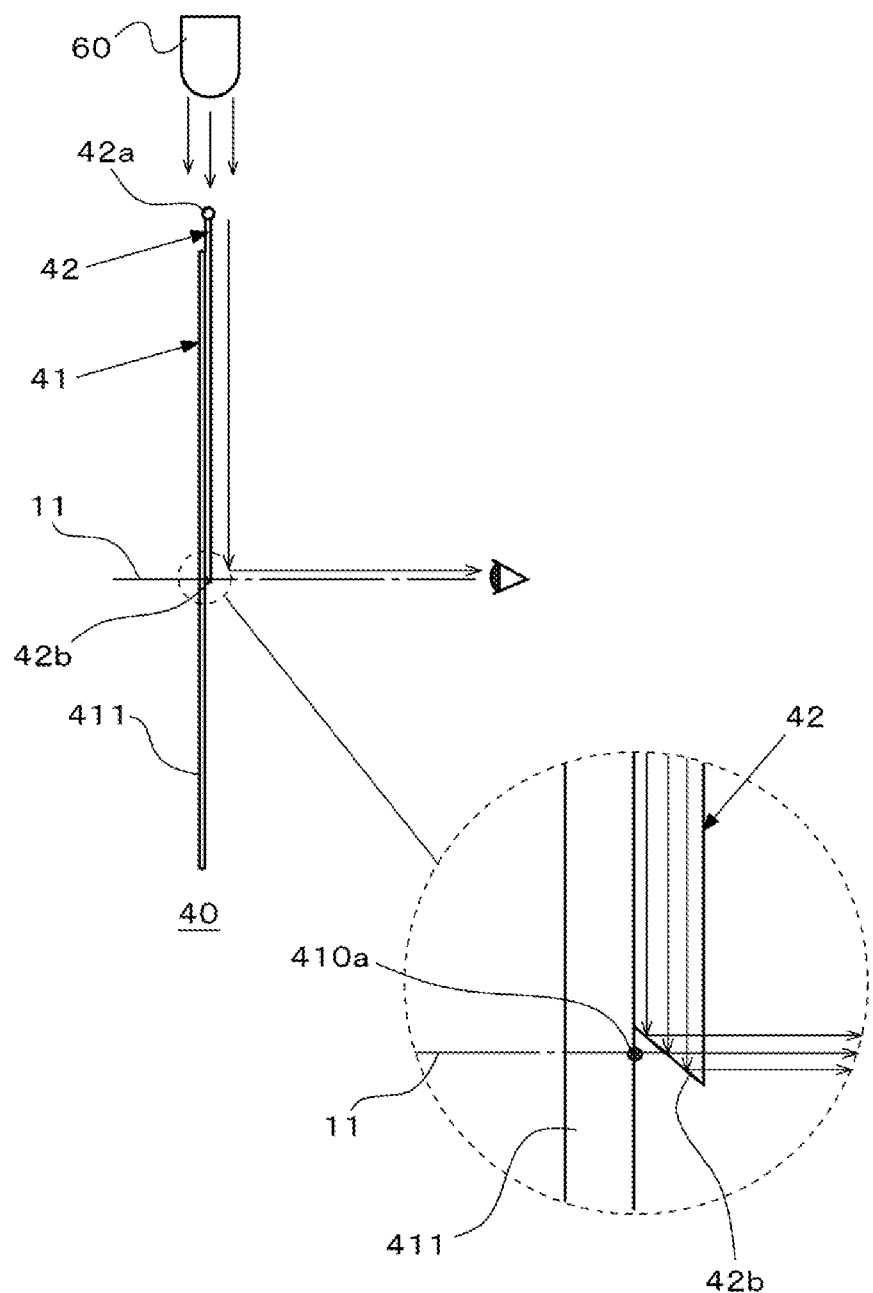
FIG. 4 is a side view showing the reticle unit.

FIG. 2 to FIG. 4 show the configuration of the reticle unit 40 of this embodiment. The reticle unit 40 includes a reticle 41, an optical fiber 42, and a metal frame 43.

As shown in FIG. 2, the reticle 41 includes a peripheral portion 41a and the sight line 410. The sight line 410 spans a circular opening formed by the peripheral portion 41a. The reticle 41 of this embodiment includes one thin metal plate. A material of the reticle 41 is not particularly limited, and a metal plate of nickel alloy is used, for example. A manufacturing method of the reticle 41 is not particularly limited, and the reticle 41 is manufactured by electroforming, for example. Electroforming refers to a casting technique of electrodepositing electrolyzed metal ions on a surface of a master model to a predetermined thickness. In addition, the reticle 41 may be manufactured by etching a metal plate, for example.

The entire reticle 41, that is, the metal plate constituting the peripheral portion 41a and the sight line 410, is integrally continuous. As shown in FIG. 3, a vertical line 411 and a horizontal line 412 constituting the sight line 410 have the same line width as each other. The line widths of the vertical line 411 and the horizontal line 412 are not particularly limited. When the reticle 41 is made of a metal plate, the line widths of the vertical line 411 and the horizontal line 412 can be, for example, in a range of 10 μm to 500 μm, preferably 30 μm to 50 μm. As shown in FIG. 2 and FIG. 4, the center 410a of the sight line 410 coincides with the optical axis 11 in the lens barrel 10 of the optical sighting device 1.

As shown in FIG. 3, the optical fiber 42 is bonded along the upper half of the vertical line 411 that constitutes the sight line 410. The optical fiber 42 has a length that exceeds the peripheral portion 41a from the center 410a of the sight line 410 and reaches the inside of a cutout portion 43b of the metal frame 43. A diameter of the optical fiber 42 is the same as the line width of the sight line 410 and is preferably in a range of 30 μm to 50 μm. A material of the optical fiber 42 may be glass or plastic. Preferably synthetic glass or quartz glass is used as the material of the optical fiber 42. Synthetic glass has excellent durability and is hard to break even if the diameter of the optical fiber 42 is small. Quartz glass has excellent transparency and reduces the loss of light passing through the optical fiber 42.

A light incident portion 42a for receiving light from the light source 60 is formed at one end of the optical fiber 42. As shown in the enlarged view in FIG. 3, the light incident portion 42a of this embodiment has a spherical surface having a diameter greater than the diameter of the optical fiber 42. The light from the light source 60 is incident on the entire spherical surface of the light incident portion 42a. A surface area of the spherical surface of the light incident portion 42a is greater than a cross-sectional area of the optical fiber 42. As a result, more light enters the optical fiber 42 from the light incident portion 42a. The spherical light incident portion 42a is formed, for example, by thermally melting one end of the optical fiber 42.

Furthermore, as shown in the enlarged view in FIG. 4, a light-emitting portion 42b for emitting light is formed at the other end of the optical fiber 42. The light-emitting portion 42b is positioned at the center 410a of the sight line 410. The light-emitting portion 42b of this embodiment is an inclined surface of 45 degrees and reflects light passing through the optical fiber 42 at a right angle. The light reflected by the inclined surface of the light-emitting portion 42b is emitted in the direction of the eyepiece lens 50 along the optical axis 11. Thereby, the dot 61 of light shown in FIG. 3 is formed at the center 410a of the sight line 410. The inclined surface serving as the light-emitting portion 42b is formed, for example, by polishing the other end of the optical fiber 42.

As shown in FIG. 2 and FIG. 3, the metal frame 43 is an annular component for mounting the reticle 41 inside the lens barrel 10. An annular recess 43a corresponding to the peripheral portion 41a of the reticle 41 is formed on a front surface of the metal frame 43. An outer diameter of the recess 43a is the same as a maximum diameter of the reticle 41, and an inner diameter of the recess 43a is the same as an inner diameter of the opening of the reticle 41. The peripheral portion 41a of the reticle 41 is fixed to the recess 43a of the metal frame 43, and the metal frame 43 is mounted inside the lens barrel 10. Although not shown, the metal frame 43 is mounted inside the lens barrel 10 to be movable in the vertical and horizontal directions.

Furthermore, the above-described cutout portion 43b is provided on the upper portion of the metal frame 43. The light incident portion 42a of the optical fiber 42 is arranged in the cutout portion 43b. The light from the light source 60 is emitted toward the cutout portion 43b and is incident on the entire spherical surface of the light incident portion 42a. As a result, more light enters the optical fiber 42 from the light incident portion 42a.

<Function and Effect>

Firstly, the reticle unit 40 of this embodiment can increase the amount of light of the dot 61 formed at the center of the sight line 410 and greatly improve the visibility of the dot 61. That is, the spherical light incident portion 42a causes more light to enter the optical fiber 42. Thereby, the light emitted from the light-emitting portion 42b, that is, the amount of light of the dot 61 is increased. Furthermore, the light-emitting portion 42b, which is an inclined surface of 45 degrees, reflects the light passing through the optical fiber 42 in the direction of the eyepiece lens 50 along the optical axis 11. Thereby, the light of the dot 61 reaches the eye of the user directly without losing the amount of light.

Secondly, the reticle unit 40 of this embodiment has excellent impact resistance. That is, most of the entire length of the optical fiber 42 is bonded to the reticle 41. Thereby, even if the reticle unit 40 receives a strong impact during shooting, the optical fiber 42 does not easily come off from the reticle 41.

Thirdly, the reticle unit 40 of this embodiment can be manufactured efficiently. That is, the light incident portion 42a of the optical fiber 42 is formed by thermally melting one end of the optical fiber 42. Thereby, processing defects are unlikely to occur at one end of the optical fiber 42. As a result, the occurrence rate of defective products of the optical fiber 42 is reduced, and the reticle unit 40 can be manufactured efficiently.

<Other Changes>

The reticle unit and the optical sighting device of the invention are not limited to the above-described embodiment. The configuration of the above-described embodiment can be changed to the configuration described below, for example.

The material of the reticle is not limited to metal. It is also possible to use glass as the material of the reticle. In that case, the sight line is drawn on the surface of the glass substrate. A sight line having a smaller line width than the sight line 410 of the metal reticle 41 may be drawn on the surface of the glass substrate. That is, the line width of the sight line drawn on the surface of the glass substrate can be, for example, in a range of 2 μm to 200 μm, preferably 2.5 μm to 50 μm.

In addition, the sight line of the reticle is not necessarily integrally provided on the metal plate by a method such as electroforming or etching. The sight line may be composed of one or more wires. Moreover, the design of the sight line is not limited to the cross of the embodiment. The term "sight line (line of sight)" includes various patterns composed of one or more lines for aiming at a target. The design of the sight line can be a T, an inverted T, a vertical line or a horizontal line, for example. Furthermore, when the sight line is composed of a plurality of lines, the line widths of the lines may not be the same.

Figure 5:
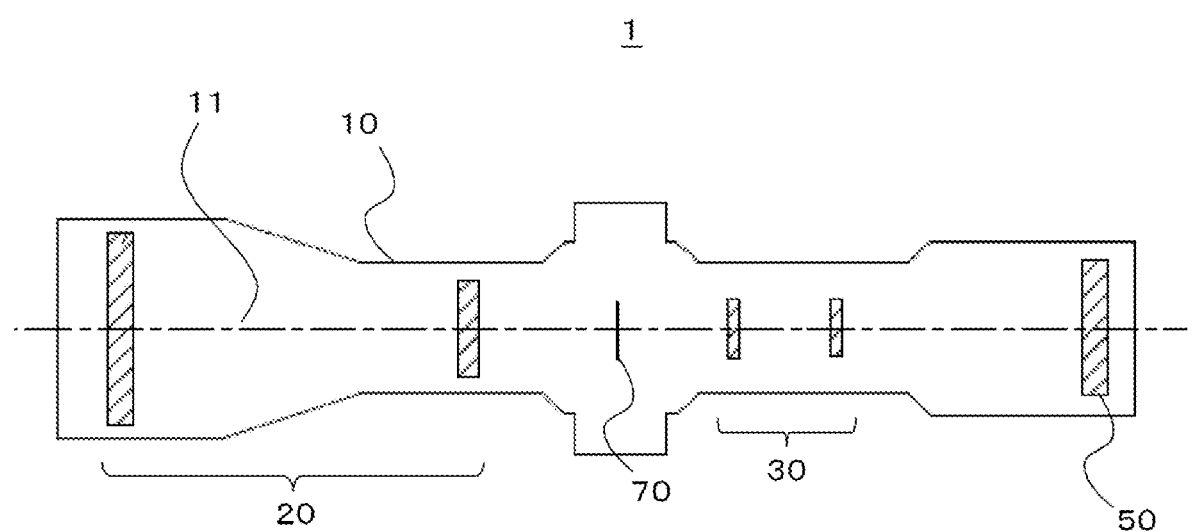
FIG. 5 is a schematic view showing the second embodiment of the optical sighting device of the invention.

The position of the reticle unit in the lens barrel is not limited to the position of FIG. 1. The reticle unit 40 shown in FIG. 1 is arranged at a position where the upright image is formed by the upright lens 30. However, as shown in FIG. 5, a reticle unit 70 may be arranged at a position where the inverted image is formed by the objective lens 20. Here, the image of the sight line of the reticle unit 70 arranged at the position of FIG. 5 is magnified by the upright lens 30 to a predetermined magnification. Therefore, the reticle unit 70 arranged at the position of FIG. 5 is preferably made of glass for drawing a sight line having a smaller line width.

The position of the light source in the lens barrel is not limited to the position shown in FIG. 3 and FIG. 4. The position of the light source can be changed according to the design of the sight line. For example, in the case of a cross like the sight line 410 of this embodiment, the light source 60 can be arranged on the top, bottom, left or right of the sight line 410. When the sight line is a T, the light source 60 can be arranged on the bottom, left or right. When the sight line is an inverted T, the light source 60 can be arranged on the top, left or right. When the sight line is a vertical line, the light source 60 can be arranged on the top or bottom. When the sight line is a horizontal line, the light source 60 can be arranged on the left or right.

DESCRIPTIONS OF REFERENCE NUMERALS 1 optical sighting device (rifle scope)
10 lens barrel
11 optical axis
20 objective lens
30 upright lens
40 reticle unit
41 reticle
41a peripheral portion
410 sight line
410a center
411 vertical line
412 horizontal line
42 optical fiber
42a light incident portion
42b light-emitting portion
43 metal frame
43a recess
43b cutout portion
50 eyepiece lens
60 light source
61 dot
70 reticle unit

What is claimed is:
1. A reticle unit comprising:
a reticle that has a sight line;

an optical fiber that forms a dot by guiding light from a light source to a center of the sight line; and a metal frame to which the reticle is attached, wherein a light incident portion for receiving light is formed at one end of the optical fiber and arranged in a cutout portion of the metal frame, a light-emitting portion for emitting light is formed at another end of the optical fiber, the light incident portion has a spherical surface that has a diameter greater than a diameter of the optical fiber, the light-emitting portion has an inclined surface that reflects light passing through the optical fiber, and the optical fiber is fixed along a part of the sight line so that the light-emitting portion is positioned at the center of the sight line.

2. The reticle unit according to claim 1, wherein the optical fiber has a diameter equal to or smaller than a line width of the sight line and is bonded along a part of the sight line.

3. The reticle unit according to claim 1, wherein the optical fiber is composed of a glass material, and the light incident portion is formed by thermally melting one end of the optical fiber.

4. The reticle unit according to claim 1, wherein an angle of the inclined surface of the light-emitting portion is 45 degrees, and the inclined surface reflects light passing through the optical fiber at a right angle.

5. The reticle unit according to claim 1, wherein the reticle is made of a thin metal plate, and the sight line is integrally provided on the metal plate.

6. An optical sighting device with a reticle unit built in a lens barrel, wherein the reticle unit comprises a reticle that has a sight line, an optical fiber that forms a dot by guiding light from a light source to a center of the sight line, and a metal frame to which the reticle is attached, a light incident portion for receiving light is formed at one end of the optical fiber and arranged in a cutout portion of the metal frame, a light-emitting portion for emitting light is formed at another end of the optical fiber, the light incident portion has a spherical surface that has a diameter greater than a diameter of the optical fiber, the light-emitting portion has an inclined surface that reflects light passing through the optical fiber, and the optical fiber is fixed along a part of the sight line so that the light-emitting portion is positioned at the center of the sight line.

7. The reticle unit according to claim 2, wherein the optical fiber is composed of a glass material, and the light incident portion is formed by thermally melting one end of the optical fiber.

8. The reticle unit according to claim 2, wherein an angle of the inclined surface of the light-emitting portion is 45 degrees, and the inclined surface reflects light passing through the optical fiber at a right angle.

9. The reticle unit according to claim 3, wherein an angle of the inclined surface of the light-emitting portion is 45 degrees, and the inclined surface reflects light passing through the optical fiber at a right angle.

10. The reticle unit according to claim 2, wherein the reticle is made of a thin metal plate, and the sight line is integrally provided on the metal plate.

11. The reticle unit according to claim 3, wherein the reticle is made of a thin metal plate, and the sight line is integrally provided on the metal plate.

12. The reticle unit according to claim 4, wherein the reticle is made of a thin metal plate, and the sight line is integrally provided on the metal plate.

* * * * *